March 5, 1929.  B. B. HOLMES  1,704,002
MEANS FOR RESTRAINING THE REBOUND OF PNEUMATIC TIRES
Original Filed Sept. 27, 1924
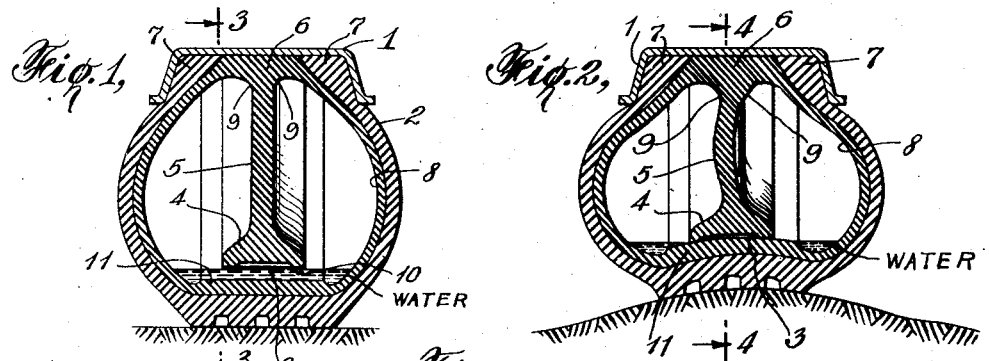
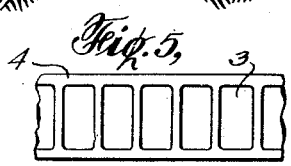
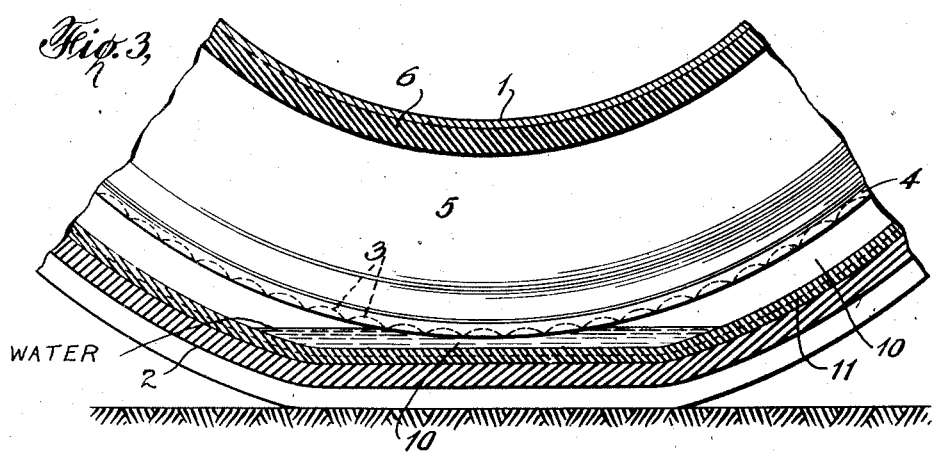
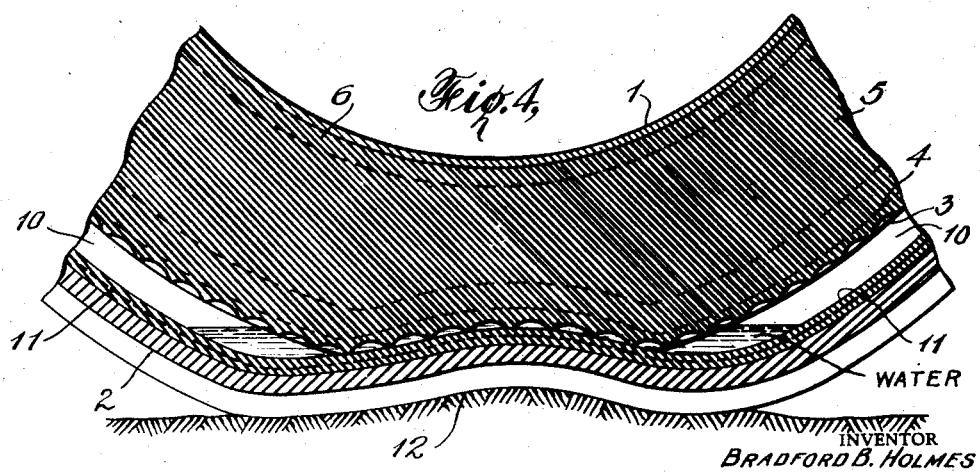
INVENTOR
BRADFORD B. HOLMES
BY
ATTORNEY Patented Mar. 5, 1929.

1,704,002

UNITED STATES PATENT OFFICE.

BRADFORD B. HOLMES, OF NEW YORK, N. Y.

MEANS FOR RESTRAINING THE REBOUND OF PNEUMATIC TIRES.

Refiled for abandoned application Serial No. 740,157, filed September 27, 1924. This application filed March 31, 1927. Serial No. 179,758.

This application is refiled for my abandoned application, Serial No. 740,157 filed September 27, 1924, for means for restraining the rebound of pneumatic tires.

The general object of my invention is to provide means of exerting a force which will act to reduce the violence of the rebound of a vehicle in so far as results from expansion of a pneumatic tire assembly following a deformation such as is produced by an irregularity in the road surface.

Another object is to accomplish such a result by applying the retraining force mentioned to the tire assembly itself.

Another object is to accomplish the same result by means self-contained within the tire assembly itself.

Another object is to accomplish the same result by providing means whereby so much of the inner surface of the portion of the tire assembly as is compressed beyond a predetermined amount will be retarded in recovering its normal shape, thus correspondingly modifying the violence of the rebound which would normally result from unrestrained expansion.

Another object is to provide means whereby the necessary restraining force may be created.

Another object is to accomplish the results above set forth by providing means whereby a compressed portion of the tire is caused to adhere momentarily to a relatively fixed surface in the interior of the tire when the deformation exceeds a predetermined amount, the force of adherence acting as a restraining force.

Another object is to provide means whereby suction may be utilized as the necessary force for retarding the recovery of the tire to normal shape.

I illustrate and describe my invention as embodied in a conventional pneumatic tire assembly; that is to say, a tire provided with an air tight lining or "inner tube" so called. It is to be understood, however, that I am utilizing this particular pneumatic tire construction merely as a matter of convenience in explaining the invention, and that the full scope of the invention is to be considered as defined by the appended claims.

As far as the utility of the invention is concerned it is also to be understood that it may be used in association with tire assemblies of any dimensions, or relative dimensions, and with any internal air pressure or load.

It is appreciated, however, that the dimensions of tire ordinarily employed until very recently have been such that the rebound caused by them has not been a serious factor in the steadiness of travel of the vehicles to which they have been applied. Recently, however, there has come into use a type of tire known as the "balloon" type characterized by the fact that a relatively low internal pressure and large cross section area are substituted for the relatively high internal pressure and small cross section area of the earlier type. While tires of this type are very efficient in reducing the violence of the smaller road shocks they are nevertheless, very resilient by reason of the relatively large volume of low pressure air with which they are inflated, and when they are compressed beyond a certain amount as they are by elevations or depressions in the road surface, the ensuing free expansion causes a violent rebound of the vehicle, the violence of the rebound depending upon the extent of the compression.

Referring to the drawings:

Fig. 1 is a view in cross-section of a conventional tire assembly.

Fig. 2 is a view in cross-section of the tire assembly shown in Fig. 1, the tire and other parts being in a state of deformation due to an external compressive force.

Fig. 3 is a view of the tire of Fig. 1 on the line 3—3 of that figure, a substantial segment of tire, however, being shown in his figure.

Fig. 4 is a similar view on the line 4—4 of Fig. 2.

Fig. 5 is a face view of the so-called sucker or vacuum cup strip.

The particular force which I prefer to employ for bringing about the desired adherence of a compressed portion of the tire to the relatively fixed surface is suction, and this force may conveniently be exerted in a way to accomplish my object by means of a series of vacuum cups, or "suckers" in the interior of the tire and presenting themselves in a radial direction with respect to the center of the wheel, so that they are adapted to engage an opposite registering surface supported by the tire or inner tube, as the case may be. For instance, assume a conventional rim 1, and the flexible tire 2. The suckers or vacuum cups may consist of depressions or pockets 3 in the outer surface of an annular strip 4 of rubber or other resilient material which in turn is supported by a web 5, likewise of rubber or other resilient material. Support for the web may be provided in the form of an annular strip 6, which may be considered to form the inner internal periphery of the tire and which may be so shaped in cross section as to tightly fit the rim and also the space between the beads 7—7 of the tire. The inner tube 8 may be split annularly along its inner periphery so that the web will project through into the interior of the tube and the edges 9—9 of the tube may be vulcanized or otherwise suitably united to the strip 6. This construction makes an air tight structure, but is to be considered as an example only of a suitable illustrative structure in which my invention may be incorporated. The particular way in which the sucker strip is mounted is not obviously material to my invention and provided the desired results are obtained, the structure may be fabricated by employing any suitable method.

Some clearance 10 is allowed between the sucker strip and the surface of the tube toward which it is presented, the amount of this clearance depending upon considerations which will be hereinafter referred to. It may merely be noted for the present that if a portion of the tread of the tire is compressed, as shown in Fig. 3, the compressed portion approaches the particular suckers which are presented toward it, and if the compression is carried far enough to engage the suckers as shown, in Fig. 4, the air is wholly or partly expelled from them and a releasable engagement constituting a potential resistance to expansion of the compressed portion is thereby created. It is preferable that the outer internal periphery which is to engage the suckers be thickened as shown at 11 and formed to present a surface which will register as perfectly as possible with the edges of the suckers when contact takes place. The thickened portion not only is better adapted to resist the strains imposed on it, but it also lends a certain rigidity to the tread with a consequent increased resistance to parting when, after the suckers and tube have become engaged, expansion of the compressed portion takes place as a result of the compressive force ceasing to act.

The operation of the device is as follows:
As the vehicle travels over the road it repeatedly passes over elevations such as indicated by 12 (Fig. 4) or depressions which cause a sudden and substantial compression of the tire and inner tube over the area including and surrounding the region of impact. The corresponding area of the interior of the tube or tire is, therefore, forced inwardly and if the impact be sufficient it meets the sucker strip. The latter being suitably stiff engages with the outer internal periphery of the tube and the air is forced from the suckers. The material and the parts being resilient work is done on them when the tire is in process of resuming its normal shape and thus a large part of the energy which would otherwise be expended in accelerating the return of the tire to normal shape is in fact absorbed by these resilient parts and a proportionate reduction in the violence of rebound of the vehicle is the consequence.

In order to insure a more perfect action of the vacuum cups a small quantity of water, or other liquid comparatively harmless to rubber, may be introduced into the inner tube. As the vehicle wheel revolves the centrifugal force thereby produced causes this liquid to be distributed about the outer internal periphery of the tire, and the liquid therefore, serves effectively to seal the union between the vacuum cups and their co-acting surfaces, regardless of where a given compression takes place.

While I have described only a single, simple and practical embodiment of my invention, I am aware that changes and variations may be made which will, nevertheless, be within the scope of the appended claims which are as follows:

1. A pneumatic tire assembly provided with means for releasably connecting the inner and outer internal peripheries thereof when the tread portion of the tire is compressed beyond a predetermined amount, said means consisting of vacuum cups connected with one of said peripheries and extending toward the other of said peripheries and spaced from the latter.

2. A pneumatic tire assembly provided with resilient means for releasably connecting the inner and outer internal peripheries thereof when the tread portion of the tire is compressed beyond a predetermined amount, said means consisting of vacuum cups connected with one of said peripheries and extending toward the other of said peripheries and spaced from the latter.

3. A pneumatic tire assembly comprising a compressible tire member having an interior cavity, and one of the internal peripheries of which is provided with a part having a plurality of vacuum cups presenting themselves toward the other internal periphery and spaced therefrom, said cups being adapted to connect said peripheries yieldingly at times.

4. A pneumatic tire assembly comprising a compressible tire member having an interior cavity, and one of the internal peripheries of which is provided with a part having a plurality of resiliently supported vacuum cups presenting themselves toward the other internal periphery and spaced therefrom, said cups being adapted to connect said peripheries yieldingly at times.

5. A pneumatic tire assembly comprising a compressible tire member having an interior cavity, and an annular strip projecting from one of the inner walls of said cavity, said strip being provided with vacuum cups presented toward another position of said inner walls, said strip being resiliently supported, and said vacuum cups being spaced normally from one of said walls and adapted to connect said walls yieldingly at times.

6. A pneumatic tire assembly comprising a compressible tire member having an interior cavity, and having an annular strip supported from the inner peripheral wall of said cavity, said strip being provided with vacuum cups extending toward the opposite internal wall thereof, said vacuum cups being spaced from said other wall and adapted to engage the said other wall when the tire is compressed, and to release the same when the compressive force ceases to act.

7. A pneumatic tire assembly comprising a compressible tire member having an interior cavity, and provided in its interior with an annular rubber strip supported by a rubber web mounted on the inner internal wall of said cavity, said strip being provided with vacuum cups extending toward the outer internal wall of said cavity and spaced therefrom and adapted to engage the said outer internal wall in the region of compression when the said outer wall is compressed beyond a pre-determined amount.

8. A pneumatic tire assembly comprising a compressible tire member having an interior cavity, and provided in its interior with an annular rubber strip supported by a rubber web mounted on the inner internal wall of said cavity, said strip being provided with vacuum cups extending toward the outer internal wall of said cavity and spaced therefrom and adapted to engage the said outer internal wall in the region of compression when the said outer wall is compressed beyond a pre-determined amount, and being adapted to release said compressed portion when the compressive force ceases to act.

9. In a pneumatic tire assembly comprising a compressible tire member having an interior cavity, a device for checking the force of the rebound of said tire member, said device acting to releasably connect portions of the walls of said cavity following a compression beyond a predetermined amount.

10. In a pneumatic tire assembly comprising a compressible tire member having an interior cavity, a device for checking the rebound of said tire member, said device acting to releasably connect the inner and outer internal peripheries of the walls thereof when the tire is compressed beyond a predetermined amount.

11. A pneumatic tire comprising a compressible tire member having an interior cavity and means for checking the rebound of said tire comprising a resilient device acting to releasably connect the inner and outer internal peripheries of a portion of the tire when the said portion is compressed beyond a certain amount, the said device being adapted to absorb a part of the energy stored up by the compression and thereby reduce the violence of the rebound.

12. In a pneumatic tire assembly comprising a compressible tire member having an interior cavity, means for restraining the rebound thereof, comprising a device connected with one of the internal peripheries of said tire member and adapted releasably and resiliently to engage the other internal periphery when the tire is compressed a predetermined amount, the force resisting release being less than the force tending to expand the tire.

In testimony whereof, I have signed this specification.

BRADFORD B. HOLMES.